E. CHALLET.
MACHINE FOR ROUGH CUTTING PRECIOUS STONES.
APPLICATION FILED NOV. 10, 1915.

1,261,765.

Patented Apr. 9, 1918.
3 SHEETS—SHEET 1.

Etienne Challet Inventor:
By Frank P. Wentworth
his Atty

E. CHALLET.
MACHINE FOR ROUGH CUTTING PRECIOUS STONES.
APPLICATION FILED NOV. 10, 1915.

1,261,765.

Patented Apr. 9, 1918.
3 SHEETS—SHEET 2.

Etienne Challet   Inventor:

By Frank P. Wentworth
his Atty

Etienne Challet Inventor:
By Frank P. Wentroth
his Atty.

UNITED STATES PATENT OFFICE.

ETIENNE CHALLET, OF GENEVA, SWITZERLAND, ASSIGNOR TO L. HELLER & SON, OF NEW YORK, N. Y.

MACHINE FOR ROUGH-CUTTING PRECIOUS STONES.

1,261,765.  Specification of Letters Patent.  Patented Apr. 9, 1918.

Application filed November 10, 1915. Serial No. 60,693.

*To all whom it may concern:*

Be it known that I, ETIENNE CHALLET, citizen of Switzerland, residing at Geneva, Switzerland, 80 Rue de St. Jean, have invented certain new and useful Improvements in Machines for Rough-Cutting Precious Stones; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention relates to a machine for rough cutting precious stones in a regular form, as a preliminary to their subsequent cutting and polishing. The lapidary tool is composed of a hollow cylinder which operates on end and revolves at a high speed. At the same time an oscillating movement is imparted thereto so that the stone applied against the annular surface of its extremity produces a uniform wearing away at such surface.

Referring to the drawings.

Like letters refer to like parts throughout the several views.

Figure 2:
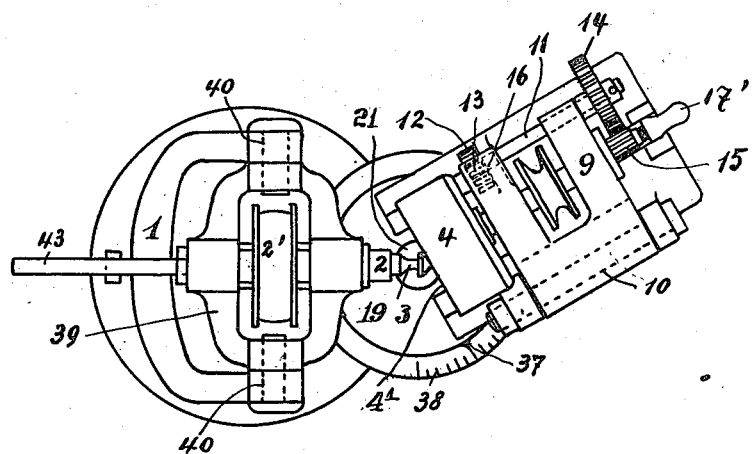
Fig. 2 is a plan view thereof.
Figure 3:
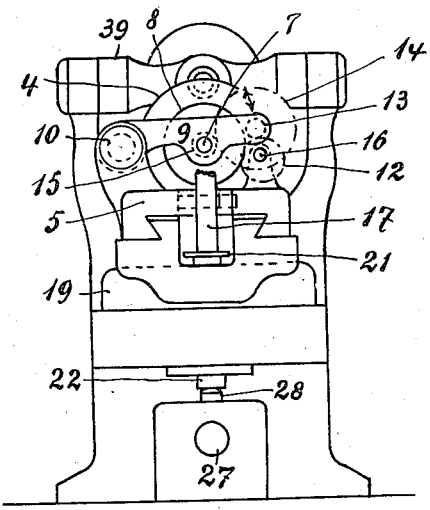
Fig. 3 is an end view thereof.

The machine comprises a frame 1 carrying a rotating spindle 2 serving to receive the stone carrying dop or block 3, and a hollow lapidary tool 4 mounted on a carriage 5 itself mounted in a rotating table, which allows the cylinder to be presented at varying angles in relation to the axis of the spindle and at the same time to be displaced longitudinally for bringing the annular surface 4' of its extremity in contact with the stone 6 to be rough cut which has been stuck in the ordinary manner on the point of the dop or block 3. The cylinder 4 is mounted, by means of a plate 4'' on a shaft 7, which carries a pulley 8 serving to rotate it at a high speed. The bearings of the shaft 7, are provided in the two arms of a fork 9 free to turn around a stem 10 on the carriage 5. This arrangement of the lapidary cylinder on a pivoted part permits of the slight oscillating movement being imparted thereto which is necessary for causing its active annular surface 4' to operate over its entire width. This oscillation is obtained by means of a return shaft passing through the extremities of the arms of the fork 9 and of a toothed disk 12 (Figs. 2 and 3) having an eccentric movement and mounted on a trunnion 16 on the carriage 5. The shaft 11 carries a pinion 13 which gears with the eccentric disk 12 and a large toothed wheel 14 which is driven by the pinion 15 on the extremity of the shaft 7. The disk 12 acts in the manner of a cam; at each rotation, it raises the fork 9 and the whole of the mechanism connected therewith. The eccentricity of the disk 12 is such that the range of oscillating movement resulting therefrom for the fork 9 corresponds approximately to the width of the annular surface 4' of the lapidary tool. Owing to this arrangement, the wearing away of the surface proceeds very uniformly and the formation of stripes is entirely avoided. The weight of the fork 9 and of the mechanism it carries suffices to maintain the pinion 13 always in contact with the eccentric disk 12 if the strap passing over the pulley 8 has a horizontal travel or a slightly downward inclined movement; otherwise, the contact must be insured by a spring acting on the fork 9.

Figure 4:
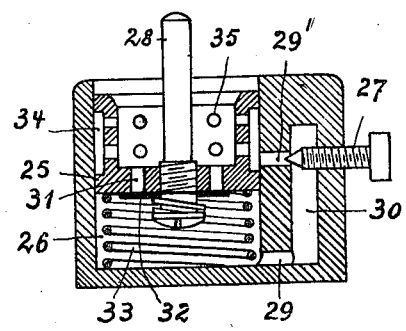
Fig. 4 is a sectional view of an oil brake for regulating the speed of feed of the carriage bearing the lapidary tool.

A bell crank lever 17 pivoted at 18 on the table 19 carrying the carriage 5 controls the advance of the latter. One arm of this lever bears with its extremity 20 against the plate 21 of a stem 22 and the other arm carries an adjusting screw 23 which bears on the extremity of the shaft 7, under the force of a spring 24 acting upon the bell crank lever 17. This spring therefore tends to advance the carriage 5 with all the mechanism it carries to maintain the lapidary cylinder 4 with a light pressure in contact with the stone 6 to be rough cut. The rate of this advance of the carriage is regulated by an oil brake controlled by the stem 22, on which the extremity 20 of the lever 17 bears. This brake (Fig. 4) consists in a piston 25, the rate of displacement of which within an oil chamber 26 may be rendered variable by a pointed screw 27 enabling the outlet orifice of the oil expelled by the piston when the stem 22 operates, in its descent, on the piston rod 28 to be more or less restricted. The chamber 26 communicates by two orifices 29 and 29' with a passage 30 and the travel of the piston is limited between these two orifices, one of which can be throttled by the point of the adjusting screw 27. This arrangement enables the oil to pass behind the piston and orifices 31 in the latter allows it to pass back to the front of the piston after each operation. A spring washer 32, applied against the face of the piston 25, under the effect of the pressure of oil, keeps the orifices 31 closed during the advance of the piston and allows the passage of oil through these orifices during the return of the piston. A spiral spring 33 situated in the chamber 26 so that it is compressed by the advance of the piston serves to automatically return it back after each operation. To permit of this return, the pressure which is exercised upon the stem 22 by the lever 17, is released by tipping the lever by means of its handle 17'. A stop notch may be provided to hold the lever in this position. The piston 25 is hollow; it has two bearing surfaces separated by an annular groove 34 which communicates with the interior of the piston by the orifices 35.

Figure 8:
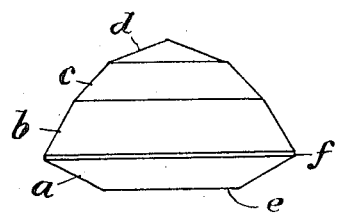
Fig. 8 is a view of a rough cut stone as prepared by a machine made in accordance with my invention.

The table 19 which is formed with ways guiding the carriage 5 is screwed on a pivot 36 turning in the frame 1. This pivot enables the table to turn and to cause the lapidary cylinder 4 to operate at the variable angles necessary to grind the surfaces *a*, *b*, *c* and *d* of the stone, which are inclined in relation to its axis (Fig. 8).

When the axis of the cylinder 4 and that of the dop or block 3 are situated in the same place, only the face *e* of the stone can be operated upon. For operating upon the other surfaces, it is necessary to turn the table. An index 37 on the latter and a scale 38 on the frame facilitates the adjustment of the table to the different angles predetermined by the form of the stones by the workman.

Figure 5:
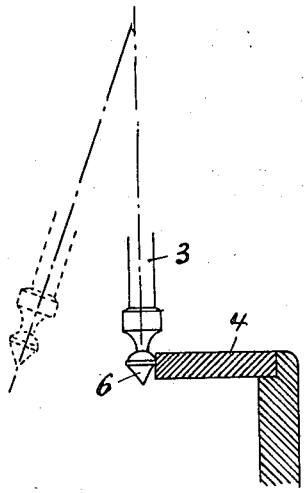
Fig. 5 is a detail view showing the machine as set for cutting the girdle or "fillet" of a stone.

For the grinding of the zone *f*, called the "fileti" of the stone, the spindle 2 should be set radially in relation to the axis of the lapidary cylinder. For this operation use is made of a machine identical to that hereinbefore described but in which the spindle 2 which receives the stone carrying dop or block is arranged vertically so as not to interfere with the advance of the cylinder (Fig. 5).

Figure 1:
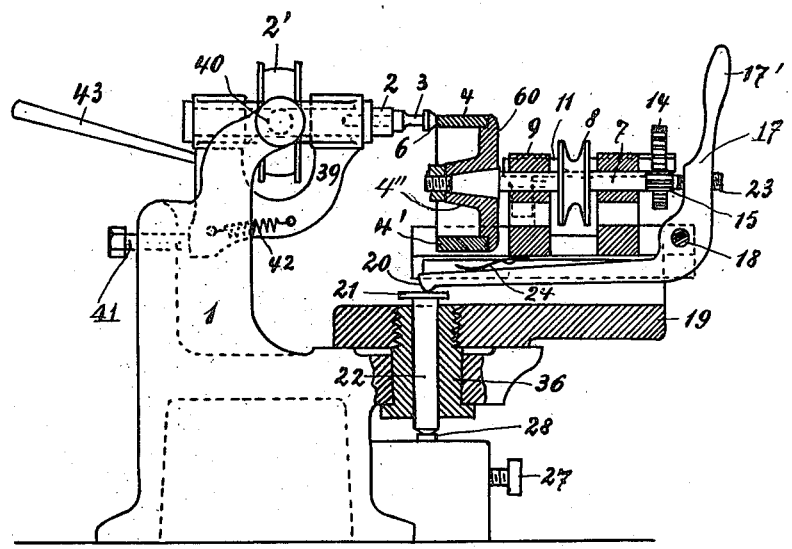
Figure 1 is a vertical section of a machine embodying my invention.

The dop or block 3 may be screwed on the spindle 2 (Fig. 1). For mounting and removing it, it should be turned away from the cylinder 4. To allow of this movement, the spindle 2 and its pulley 2' are mounted in a frame 39 pivoted on two trunnions 40 provided in a forked portion of the frame 1. In the operative position, the frame 39 is held against a screw stop 41 by a spring 42 and to move it to the position to allow of the changing of the dop or block, it suffices to lower the lever 43.

Figure 6:
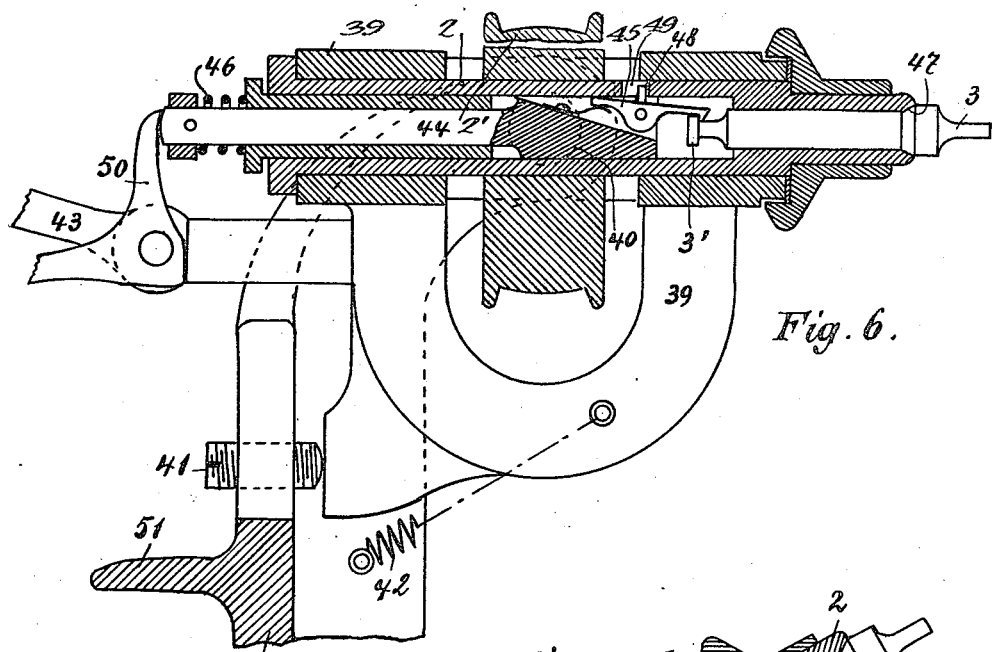
Figs. 6 and 7 are sectional views of the spindle mechanism, the spindle being shown at different positions in said views.
Figure 7:
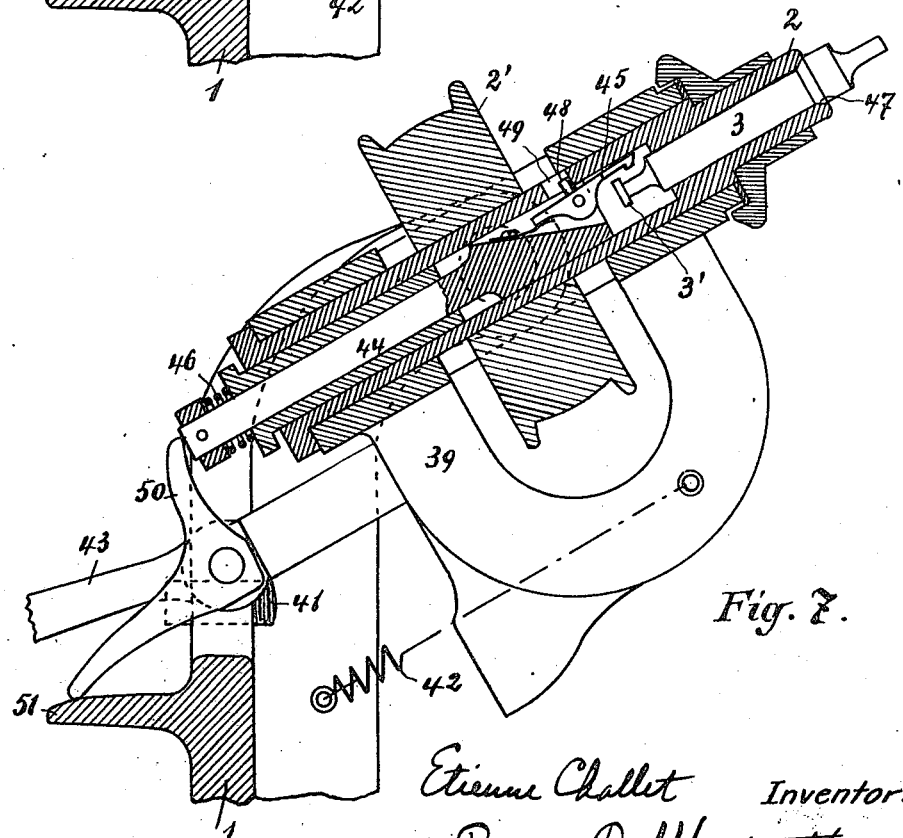

This oscillation may be utilized to automatically release the dop or block 3. According to Figs. 6 and 7 which illustrate a similar arrangement, the dop or block 3 is formed with a heel piece 3' by which it is retained in the spindle 2, by means of a spring stem 44 carrying a hook 45 which is also spring actuated. This hook seizes the dop or block by its heel 3', whereas the spring 46 by exercising a pull on the stem 44, in one with the hook 45, holds the dop or block against the conical entrance 47 of the spindle with a pressure sufficient to insure the operation of the dop or block. The hook 45 is pivoted in a slot which is situated in the fore part of the stem 44; it is provided with a small finger 48 which extends into an opening 49 in the spindle 2. This opening is situated so that the finger 48 abuts against its wall when the stem 44 is forced home within the spindle and that a pivoting of the hook 45 ensues which liberates the dop or block 3. A bell crank lever 50 pivoted on a pin solid with the frame 39 is arranged in such a way that it may serve to force home the stem 44 within the spindle and, so that the operation may take place automatically when the spindle is pivoted, an abutment 51 is provided on the frame against which the lever 50 is arrested, which compels this lever to turn and produces the forcing home of the stem 44 within the spindle 2. It is in this position represented in Fig. 7 that the changing of the stone carrying dop or block is effected.

The machine hereinbefore described is especially useful for the rough cutting of artificial stones of oxid of alumina for it enables them to be rough cut in series and the duration of the operations to be varied according to the extent of the surfaces to be ground by simply acting upon the regulating screw 27 of the oil brake.

Having thus described my invention, what I claim and wish to secure by Letters Patent of the United States is:

1. A machine for rough cutting precious or imitation stones embodying therein a holder for the stones, a rotatable support for said holder, means whereby said support may be continuously rotated, a carriage adapted to have movement toward and from said holder, a rotatable lapidary wheel mounted upon said carriage, a pivotal support for said carriage whereby the work face of said lapidary wheel may be set at any desired angle to the axis of said holder, and means whereby light yielding contact of the lapidary wheel and the stone being cut is maintained.

2. A machine for rough cutting precious or imitation stones embodying therein a holder for the stones, a carriage adapted to have movement toward and from said holder, a rotatable lapidary wheel mounted upon said carriage, a pivotal support for said carriage whereby the work face of said lapidary wheel may be set at any desired angle to the axis of said holder, spring actuated means normally exerting pressure upon said carriage to yieldingly thrust it toward said holder and means regulating the thrust of said means.

3. A machine for rough cutting precious stones having a hollow cylindrical grinding tool working endwise, means to impart a slight oscillating movement to the said grinding tool, a sliding carriage supporting the latter, and an oil brake to regulate the advance of said carriage.

4. A machine for rough cutting precious or imitation stones embodying therein a holder for the stones, a carriage adapted to have movement toward and from said holder, a rotatable lapidary wheel mounted upon said carriage, a pivotal support for said carriage whereby the work face of said lapidary wheel may be set at any desired angle to the axle of said holder spring actuated means normally exerting pressure upon said carriage to yieldingly thrust it toward said holder and means regulating the thrust of said means comprising an oil chamber, means forming a passage adjacent said chamber, said chamber and said passage being in communication on different levels, a piston having a port therethrough, mounted in said chamber, a check valve controlling said port mounted on the bottom of said piston whereby movement of said piston in one direction is possible only with the displacement of oil in said chamber and delivery through said passage to above said piston, a spring acting upon said piston to force it outwardly of said chamber and operative connections between said piston and said spring actuated means.

5. A machine for rough cutting precious or imitation stones embodying therein a holder for the stones, a carriage adapted to have movement toward and from said holder, a rotatable lapidary wheel mounted upon said carriage, a pivotal support for said carriage whereby the work face of said lapidary wheel may be set at any desired angle to the axis of said holder, a bell crank lever, one arm of which is adapted to act upon said carriage and the other arm of which is adapted to be acted upon by a brake mechanism, a spring acting upon said lever and normally exerting a thrust thereon adapted to yieldingly force said carriage toward said holder for the stones, and a brake mechanism comprising an oil chamber, means forming a passage adjacent said chamber, said chamber and said passage being in communication on different levels, a piston having a port therethrough mounted in said chamber, a check valve controlling said port mounted on the bottom of said piston whereby movement of said piston in one direction is possible only with the displacement of oil in said chamber and delivery through said passage to above said piston, a spring acting upon said piston to force it outwardly of said chamber, means whereby the rate of flow of oil from said chamber may be regulated, and a piston stem adapted to operatively engage one arm of said bell crank lever.

6. A machine for rough cutting precious or imitation stones embodying therein a holder for the stones, a carriage adapted to have movement toward and from said holder, a rotatable lapidary wheel mounted upon said carriage, a pivotal support for said carriage whereby the work face of said lapidary wheel may be set at any desired angle to the axis of said holder, means whereby light yielding contact of the lapidary wheel and the stone being cut is maintained and means imparting oscillatory movement to said lapidary wheel.

7. A machine for rough cutting precious or imitation stones embodying therein a holder for the stones, a carriage adapted to have movement toward and from said holder, embodying therein a pivotal member movable about an axis extending longitudinally of said carriage, a shaft mounted in said member, means whereby said shaft may be rotated, a lapidary wheel mounted upon the end of said shaft toward said holder for the stones, a shaft mounted upon said carriage, a cam upon said last named shaft engaging said member, gears connecting said shafts, a pivotal support for said carriage whereby the work face of said lapidary wheel may be set at any desired angle to the axis of said holder, and means whereby light yielding contact of the lapidary wheel and the stone being cut is maintained.

8. A machine for rough cutting precious or imitation stones embodying therein a holder for the stones, comprising a pivotal frame, a spindle rotatably mounted in said frame, a spring acting upon said frame, a stop limiting the operative effect of said spring upon said frame, and means carried by said spindle whereby a dop or block may be mounted to rotate with said spindle, a carriage adapted to have movement toward and from said holder, a rotatable lapidary wheel mounted upon said carriage, a pivotal support for said carriage whereby the work face of said lapidary wheel may be set at any desired angle to the axis of said holder, and means whereby light yielding contact of the lapidary wheel and the stone being cut is maintained.

9. A machine for rough cutting precious or imitation stones embodying therein a holder for the stones, comprising a pivotal frame, a spindle rotatably mounted in said frame, a spring acting upon said frame, a stop limiting the operative effect of said spring upon said frame, and means carried by said spindle whereby a dop or block may be mounted to rotate with said spindle, said last named means consisting of a stem slidably mounted in said spindle, a spring actuated hook carried by said stem, a spring acting upon said stem, a stud carried by said hook, said spindle having a way therein in which said stud is seated and of a length to cause the engagement of said stud with said spindle to oscillate said hook to release the dop or block, a lever mounted on said frame, and an abutment on the frame of the machine adapted to be engaged by said lever when said frame is moved to disengage a stone from a lapidary wheel, whereby such movement of the frame will automatically actuate said stem and said hook to release the dop or block, a carriage adapted to have movement toward and from said holder, a rotatable lapidary wheel mounted upon said carriage a pivotal support for said carriage whereby the work face of said lapidary wheel may be set at any desired angle to the axis of said holder, and means whereby light yielding contact of the lapidary wheel and the stone being cut is maintained.

In testimony that I claim the foregoing I have hereunto set my hand this sixteenth day of September, 1915.

ÉTIENNE CHALLET.

Witnesses:
    H. W. FRIEDLAND,
    R. SOLLBERGER.